No. 869,677. PATENTED OCT. 29, 1907.
T. WRIGHT.
DUMPING WAGON.
APPLICATION FILED JUNE 5, 1905. RENEWED SEPT. 19, 1907.

2 SHEETS—SHEET 1.

WITNESSES:
John J. Kittle
Isaac B. Owens.

INVENTOR
Thomas Wright
BY
ATTORNEYS

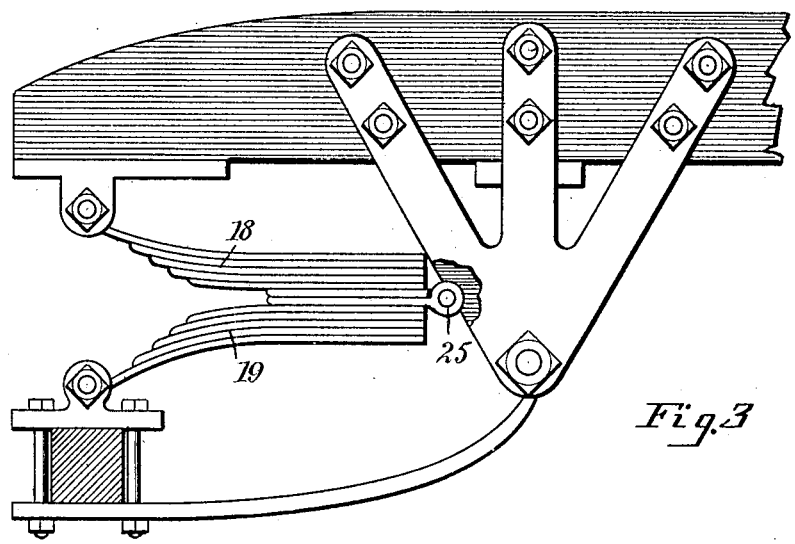
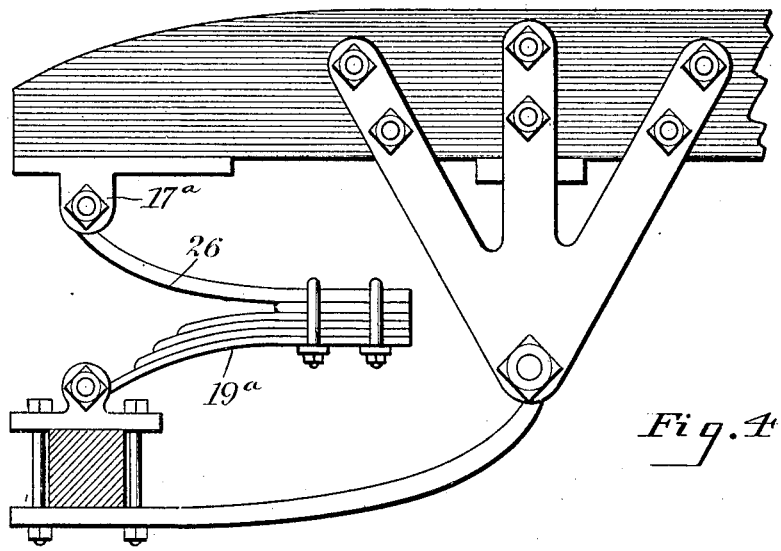

UNITED STATES PATENT OFFICE.

THOMAS WRIGHT, OF JERSEY CITY, NEW JERSEY.

DUMPING-WAGON.

No. 869,677.

Specification of Letters Patent.

Patented Oct. 29, 1907.

Application filed June 5, 1905. Serial No. 263,743. Renewed September 19, 1907. Serial No. 393,690.

*To all whom it may concern:*

Be it known that I, THOMAS WRIGHT, a citizen of the United States, and a resident of Jersey City, in the county of Hudson and State of New Jersey, have invented a new and Improved Dumping-Wagon, of which the following is a full, clear, and exact description.

The invention relates to a novel manner of mounting the bed of a wagon, particularly of a dumping wagon, upon the rear axle.

The object of the invention is to distribute the load on the vehicle as fully as possible, and to provide a set of springs which will be more durable and efficient than those heretofore employed.

The invention resides in certain novel features of construction and arrangement which will be fully set forth hereinafter and particularly pointed out in the claims.

Figure 1:
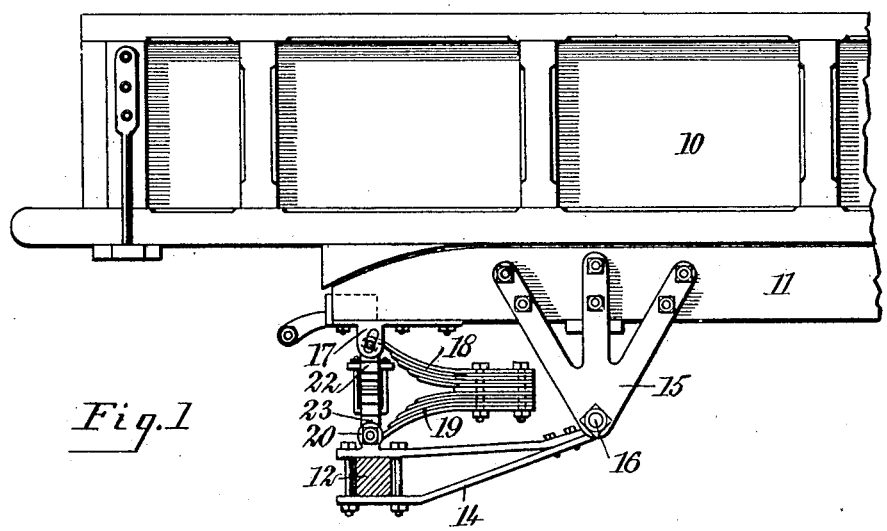
Figure 2:
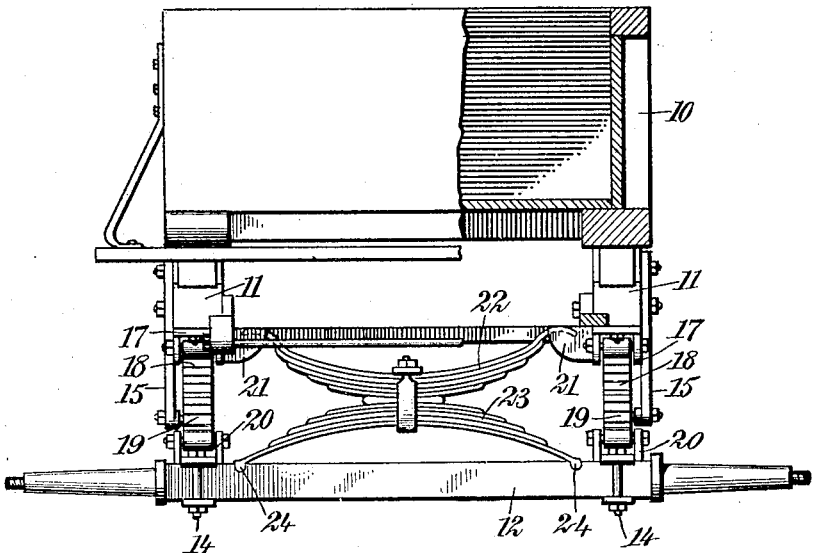

Reference is had to the accompanying drawings which form a part of this specification, in which drawings like characters of reference indicate like parts in the several views, and in which Figure 1 is a side view of the rear portion of the body of the wagon showing the axle in section, and illustrating the means for mounting the wagon on the axle; Fig. 2 is a rear elevation of the wagon with parts in section; and Figs. 3 and 4 are views showing certain possible modifications in the form of the springs.

Referring to Figs. 1 and 2, 10 indicates the body of the wagon which rests on the bed in the usual manner. Said bed is formed with longitudinal beams 11 connected in the usual manner. 12 indicates the rear axle. This axle is provided near each end with arms 14. The arms extend forward and are pivoted respectively to brackets 15 depending from the respective side beams 11. In this manner the axle is connected with the bed to swing around the center of the pivots 16 joining the parts 14 and 15.

Attached to the under side of each body timber 11 at the rear end thereof is a bracket 17. To each of the brackets is joined one arm 18 of a forked spring, the other arms 19 of said springs being joined to lips or brackets 20 mounted on top of the axle 12. The forked springs are located at each side of the wagon and extend forward from the brackets 17 and 20. The brackets 17 are forked with elongated openings which allow slight movement independently of the springs and prevents pulling the springs apart should one wheel drop into a rut in the road. Said springs are composed of leaves or sections of varying length arranged to form two arms or sections firmly bolted together, as the drawing shows. Secured to and projecting inward from each body timber 11 is a guide 21. These guides 21 are adapted to receive the ends of a half elliptic spring 22. The spring 22 is clamped or otherwise connected to a second half elliptic spring 23, the ends of which are forked as indicated at 24, and bear on the axle 12. The elements 22 and 23 are arranged with their convex sides adjacent, and they form an essentially four armed or double elliptic spring as shown.

It will be seen that in this manner the bed and the body supported thereby are mounted on the rear axle, and sustained through the medium of the various springs described, the bed being allowed to rise and fall under the tension of the springs.

Fig. 3 shows a form of the invention in which the parts 18 and 19 of the side springs are connected by a hinge 25 which allows the parts of the spring to draw apart should one of the wheels drop into a rut in the road. Fig. 4 shows a form of spring adapted for light wagons in which the spring has but one arm 19ᵃ connected to the bracket 17ᵃ by an arm 26.

Having thus described the preferred form of my invention, what I claim as new and desire to secure by Letters Patent is:

1. In a wagon, the combination of an axle, an arm attached securely thereto, a bed, a bracket depending from the bed and pivoted to the arm, and a forked spring having its arms respectively in connection with the bed and axle.

2. In a wagon, the combination of an axle, an arm attached securely thereto, a bed, a bracket depending from the bed and pivoted to the arm, and a forked spring having its arms respectively in connection with the bed and axle, said spring extending longitudinally of the wagon.

3. In a wagon, the combination of an axle, an arm attached securely thereto, a bed, a bracket depending from the bed and pivoted to the arm, and a forked spring having its arms respectively in connection with the bed and axle, said spring projecting forward from the axle longitudinally of the wagon.

4. In a wagon, the combination of an axle, arms securely attached thereto, a bed, brackets depending from the bed at opposite sides thereof and pivoted to the arms, forked springs between the bed and axle and located at each side of the vehicle, the said springs extending longitudinally of the vehicle, and the arms of the springs being respectively connected with the bed and axle, and a second spring bearing between the bed and axle and extending transversely of the wagon over the axle.

5. In a wagon, the combination of an axle, a bed, means connecting the axle and bed, said means permitting relative movement of the bed, a spring bearing between the axle and bed and extending longitudinally of the wagon, and a second spring between the axle and bed and extending transversely of the wagon over the top of the axle, the said second spring comprising two half elliptic sections secured together, guides carried by the bed and adapted to receive the ends of one of said sections of the spring, the ends of the other section bearing on the axle.

6. In a wagon, the combination of an axle, a bed, means connecting the axle and bed, said means permitting relative movement of the bed, a spring bearing between the axle and bed and extending longitudinally of the wagon, and a second spring bearing between the axle and bed and extending transversely of the wagon over the top of the axle, the second spring being formed of two half elliptic sections fastened together with their convex sides adjacent.

7. In a wagon the combination of an axle, arms securely attached thereto, a bed, brackets depending from the bed at opposite sides thereof and articulated to the arms, and forked springs located at each side of the wagon and having their members respectively connected to the axle and bed.

8. In a wagon the combination of an axle, an arm securely attached thereto, a bed, a bracket depending therefrom and articulated to the arm and a spring formed of two members hingedly connected to each other, said members being respectively connected to the axle and bed.

In testimony whereof I have signed my name to this specification in the presence of two subscribing witnesses.

THOMAS WRIGHT.

Witnesses:
ISAAC B. OWENS,
JNO. M. RITTER.